United States Patent
Souissi et al.

[19]

[11] Patent Number: 5,926,501
[45] Date of Patent: Jul. 20, 1999

[54] METHOD AND APPARATUS FOR DYNAMIC CHANNEL CONFIGURATION

[75] Inventors: Slim Souissi, Fort Worth; Casey Hill, Trophy Club, both of Tex.

[73] Assignee: Motorola, Inc., Schaumburg, Ill.

[21] Appl. No.: 08/766,447

[22] Filed: Dec. 12, 1996

[51] Int. Cl.$^6$ .................................................. H04B 15/00
[52] U.S. Cl. ........................ 375/200; 375/200; 375/202; 375/206
[58] Field of Search ...................................... 375/200, 206, 375/335, 202, 208, 347, 348; 370/335, 342, 209; 455/522, 69, 447; 379/60; 340/825.5

[56] References Cited

U.S. PATENT DOCUMENTS

5,507,008  4/1996  Kanai et al. ............................ 455/34.1

*Primary Examiner*—Stephen Chin
*Assistant Examiner*—Shuwang Liu
*Attorney, Agent, or Firm*—Pablo Meles; Charles W. Bethards

[57] ABSTRACT

A controller (112) that dynamically configures a number of channels within a communication system (100) having a predetermined bandwidth comprises a processor (710) and memory (714), wherein the processor is programmed to receive a channel request (50) from a subscriber unit (122) for an inbound transmission of information. The processor is further programmed to determine a type of information to be transmitted from the channel request and configure the predetermined bandwidth into a number of channels based on the type of information to be transmitted from the subscriber unit.

16 Claims, 8 Drawing Sheets

FIG. 1

| APPROPRIATE MODULATION TYPE/BANDWIDTH SPLITTING/ GROUPING | PURE FH | FH/DS MODULATION | PURE DS |
|---|---|---|---|
| APPLICATION | HIGH LEVEL LONG MESSAGING | MEDIUM/LOW LEVEL MESSAGING | LOCATION FINDING |
| SYSTEM CAPACITY | VERY HIGH | HIGH TO MEDIUM | LOW |
| DATA RATE | HIGH | MEDIUM TO LOW | HIGH |
| NOISE ENVIRONMENT | LOW | MEDIUM TO HIGH | MEDIUM TO HIGH |

METHOD AND APPARATUS FOR DYNAMIC CHANNEL CONFIGURATION

FIELD OF THE INVENTION

This invention relates in general to wireless communications and more specifically to dynamic channel groupings within a wireless communication system.

BACKGROUND OF THE INVENTION

The most popular spread spectrum modulation techniques for use in wireless communication systems are direct sequence (DS) and frequency hopping (FH). Depending upon the system requirements, each modulation has its set of advantages and disadvantages. In a messaging environment, frequency hopping is more attractive than direct sequence because it requires no power control at a portable subscriber unit. Direct sequence is more attractive for location finding applications (using time of arrival (TOA) or where spectral reconstruction can be used in interference cancellation scenarios.

In general, by optimizing the system toward a given application, performance is lost in other applications. For example, a system optimized for location finding will typically degrade applications for long messaging. As the messaging market grows, more and more applications are being supported by the same system (network, subscriber unit and base receiver). Thus, a need exists for a hybrid system using a combination of spread spectrum techniques that optimizes performance for each type of application.

SUMMARY OF THE INVENTION

A method for dynamically configuring a number of channels within a communication system having a predetermined bandwidth the controller steps of receiving a channel request from a subscriber unit for an inbound transmission of information, determining a type of information to be transmitted from the channel request, and configuring the predetermined bandwidth into a number of channels based on the type of information to be transmitted from the subscriber unit.

In another embodiment of the present invention, a controller that dynamically configures a number of channels within a communication system having a predetermined bandwidth comprises a processor and memory, wherein the processor is programmed to receive a channel request from a subscriber unit for an inbound transmission of information. Then, determine a type of information to be transmitted from the channel request received and configure the predetermined bandwidth into a number of channels based on the type of information to be transmitted from the subscriber unit.

In another aspect of the present invention, a controller uses a combination of spread spectrum spreading techniques wherein the controller sends a control signal to a subscriber unit to transmit in a particular spread spectrum mod. The controller comprises a processor and memory, wherein the processor performs the functions of assigning a direct sequence spread spectrum technique when the subscriber unit indicates a location finding application and otherwise assigning a frequency hopped spread spectrum technique when the controller measures a low noise level environment or assigning a hybrid frequency hopped and direct sequence spread spectrum technique when the controller measures a high noise level environment.

In yet another aspect of the present invention, a selective call transceiver that uses a combination of spread spectrum spreading techniques comprises a selective call receiver for receiving an a control signal from a controller directing the selective call transceiver to transmit in a particular spread spectrum mode and a transmitter for transmitting in the particular spread spectrum mode. The transmitter transmits using a direct sequence spread spectrum technique when the subscriber unit indicates a location finding application and otherwise uses a frequency hopped spread spectrum technique when the controller measures a low noise level environment or uses a hybrid frequency hopped and direct sequence spread spectrum technique when the controller measures a high noise level environment.

In a final aspect of the present invention, a base receiver that receives transmissions from at least one of a plurality of selective call transceivers that uses a combination of spread spectrum spreading techniques comprises a selective call receiver for receiving a channel request on a predetermined bandwidth from at least one of the plurality of selective call transceivers, the channel request including a transmission type. The base receiver further comprises a noise detector for measuring a noise level environment for the transmission of information from the at least one of the plurality of selective call transceivers to the base receiver and a processor for configuring the predetermined bandwidth into a number of channels based on the transmission type and the noise level environment.

DETAILED DESCRIPTION

Figure 1:
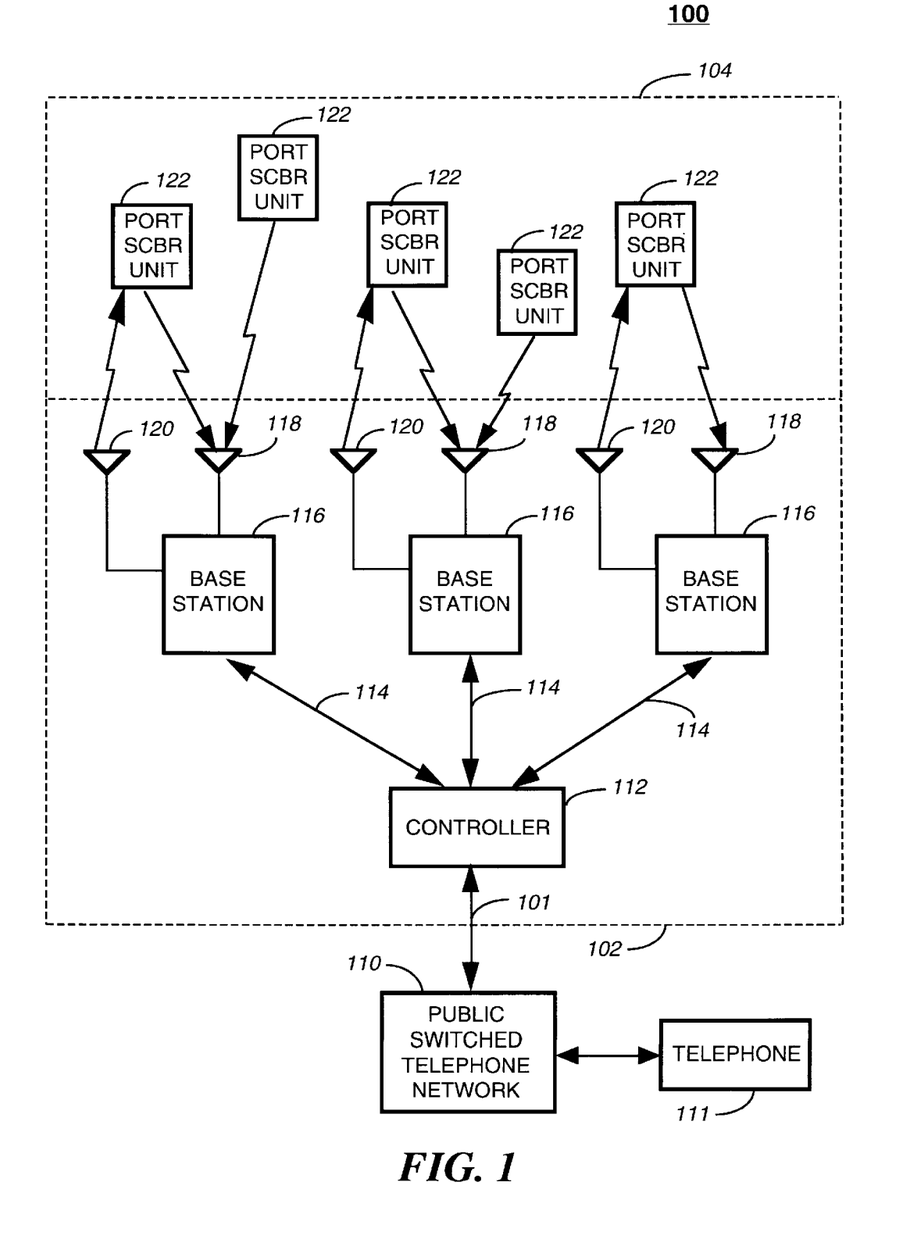
FIG. 1 is a block diagram for a hybrid spread spectrum communication system in accordance with an embodiment of the present invention.

Referring to FIG. 1, a block diagram for a spread spectrum system 100 is shown in accordance with the present invention. The system 100 preferably comprises a fixed portion 102 and a portable portion 104 which uses a user interface 111 which can simply be a conventional phone or preferably an alphanumeric entry device such as Motorola's Alphamate® alpha entry device or a computer having software allowing for a modem or an internet connection typically via a public switched telephone network 110 to a paging terminal or some other form of user access terminal (not shown). The user access terminal could be a paging terminal such as Motorola's Wireless Message Gateway™. Messages and data received at the user access terminal are preferably forwarded via link 101 and encoded, queued and batched at a controller 112. Alternatively, the functions of encoding, queuing and batching or portions of these functions can be done in separate units or within the terminal. Once the functions of queuing and batching are done, the messages can be forwarded to one or more base stations (116) over a plurality of links (114). The base stations may preferably include Motorola's Nucleus® or RF-Orchestra!™ transmitters as well as base receivers that operate in accordance with the present invention. The base receivers as shown are co-located with the transmitters, but in other embodiments the base receiver could be geographically separated from the base station. Additionally, there could be multiple base receivers per transmitter including co-located and non-co-located base receivers for every corresponding transmitter. The base station's transmitter can then transmit a selective call message over an RF outbound path via a transmitter antenna 120 to a plurality of subscriber units (122). The subscriber units 122 are preferably two way subscriber units as used in the present invention and transmit inbound messages received by the base receivers via antenna 118. It is contemplated and understood that antennas 118 and 120 could be combined with the use of a duplexer or other means as is know in the art.

The subscriber unit 122 preferably has receive and transmit capabilities. The subscriber unit 122 preferably uses an RF inbound link to transmit to an infrastructure or base receiver or a plurality of base receivers (not shown, see FIG. 11). The subscriber unit 122 can use a variety of modulation techniques (as will be further described below) for transmitting its inbound signals (i.e., acknowledgment signals, e-mail messages, canned responses, location beacon signals, etc.) including spread spectrum techniques. The base receiver is preferably linked to the controller 112 or paging terminal (not shown) which can provide reconciliation of inbound and outbound messages among other things.

The controller 112 is preferably cognizant of the two way operations and would have access to a data base in memory (or elsewhere) and processor(s) necessary to properly signal the subscriber units 122. In the present invention, signals received from the subscriber units are processed and acted on accordingly in assigning the appropriate or best modulation.

Figure 2:
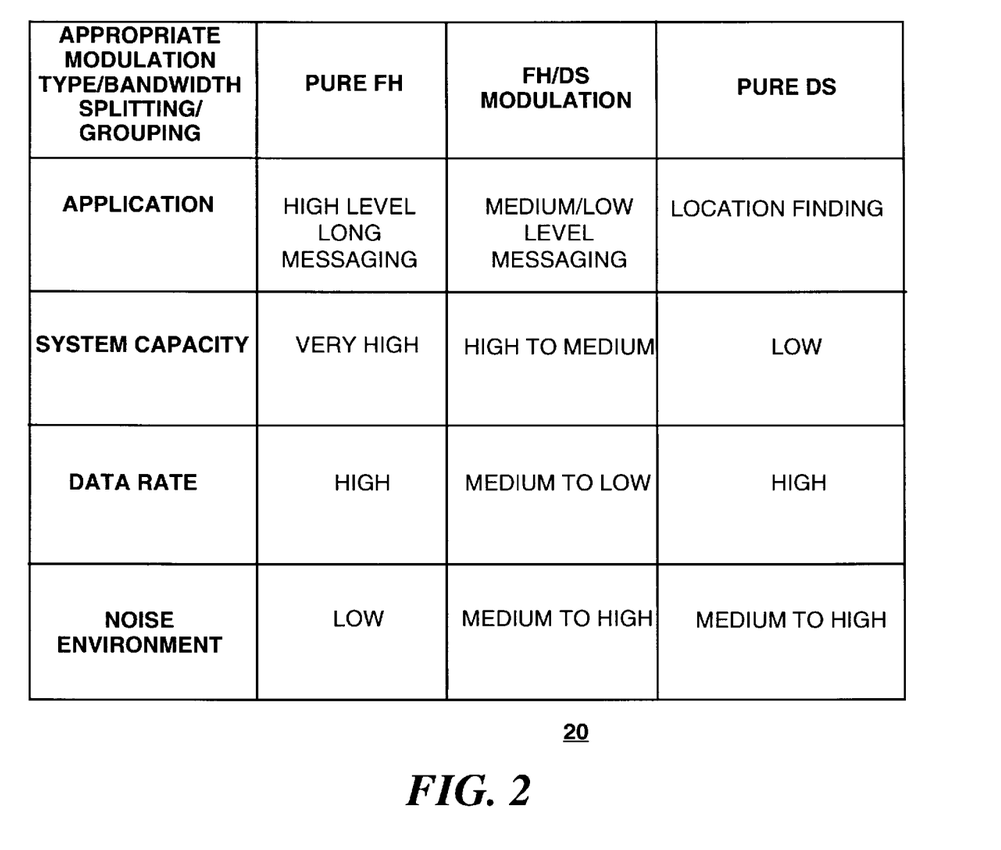
FIG. 2 illustrates a look-up table for a hybrid spread spectrum communication system in accordance with an embodiment of the present invention.

One key requirement for the survival in the noisy (time varying) environment of the Industrial, Scientific, and Medical (ISM) band is to be able to adapt to different situations (application, interference noise, data rates, etc.). FIG. 2 shows a table 20 with the appropriate modulation type for use under different scenarios, more specifically if the system supports primarily location finding, a DS modulation should be used or if the system supports high data rates, a pure frequency hopping modulation is preferably used. Hybrid DS/FH modulation is appropriate for supporting low to medium messaging applications. The FH part of a hybrid system provides the advantage of avoiding power control while DS portion provides the advantage of noise cancellation. As one can see from the chart, the choice of modulation scheme is driven primarily by the application of the signalling, but other considerations (given adequate processing power) such as noise level, system capacity and desired data rates may play an important role as well.

Figure 3:
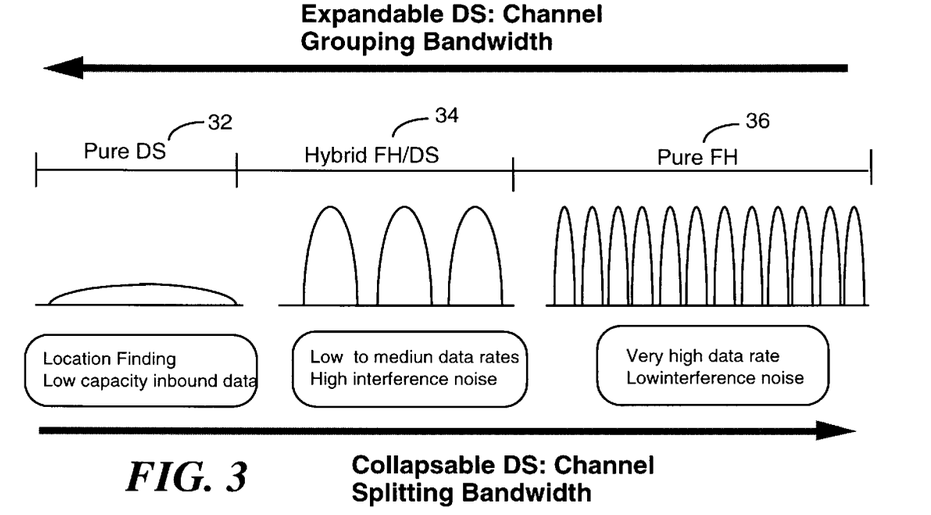
FIG. 3 is a timing diagram illustrating the operation of a hybrid spread spectrum communication system in accordance with the present invention.
Figure 4:
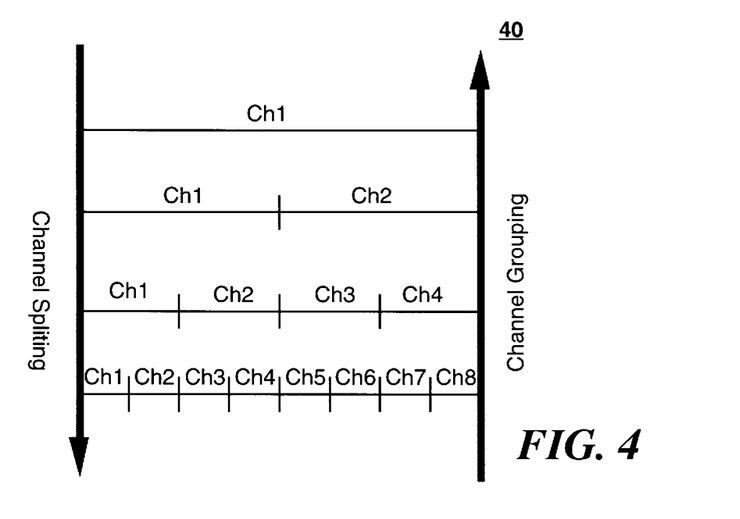
FIG. 4 is an illustration showing potential channel grouping or channel splitting in accordance with the present invention.

Referring to FIGS. 3 and 4, in traditional frequency hopping spread spectrum systems (36) the bandwidth of the hopping channel is always kept unchanged. Because of the adaptive nature of the hybrid FH/DS modulation (34), the bandwidth of a hopping channel should be adjustable thus adapting to the spread ratio and data rate in use. Direct Sequence spread spectrum systems (32) are particularly suitable for location finding but require some power control.

As the need for processing gain increases, the required hopping bandwidth increases proportionally. Channel grouping (40) should be used to contain the increased signal bandwidth. Equivalently, when processing gain drops, the guard band between adjacent channels increases. Thus, channel splitting (40) must be used to create new hops to compensate for the wasted guard band. These newly created hops contribute to a significant capacity increase.

The embodiment of channel splitting/grouping can also be used in non spread spectrum applications that operate at time varying data rates (high speeds and low speeds). Wide band channels can be used at the highest speed. At lower speeds the channel would be split into several narrow band channels.

The controller 112 of FIG. 1 must partition the air time into several time frames (not necessarily with the same size). Each time partition should be used for a specific application. FIG. 3 illustrates the example where location finding along with multi-data rate inbound messaging are supported by the same system. In slot 1 (32) only DSSS signals are allowed. In slot 2 (34) data transmission is used at low/medium data rate in a noisy environment. Finally in slot 3 (36) the system operates in a pure FH mode to deliver inbound messages at a high data rate.

When operating in the hybrid FH/DS mode, the system has the flexibility of trading processing gain for increased data rates. The system should operate at a low data rate/high spread ratio when the noise level increases. The processing gain should be gradually reduced as the noise level reduces. The additional bandwidth gained from the collapse of the spread ratio should be traded for an increased data rate. The system should also be able to change the spread ratio of the DS spread spectrum location signal.

By measuring the noise level within the ISM band the controller 112 can assign to each portable unit within the system the appropriate modulation, data rate, and spread ratio. The controller 112 must coordinate between different units and schedule them to transmit during the appropriate time frame.

Thus, in summary, the present invention discloses a hybrid inbound paging method that operates using DS spread spectrum modulation technique, or a FH modulation technique, or the hybrid combination of both as well as a method and apparatus to channel split or channel group based on the environment and application. Ideally, a Block Information Word (BIW) informs the subscriber units on the Split/Group status. Additionally, the present invention discloses a method and apparatus to expand or collapse the DS portion of the hybrid DS/FH on demand. In other words, the present invention provides for dynamic channel grouping or channel splitting. Spread ratios can also be assigned based on the ISM noise level.

Figure 5:
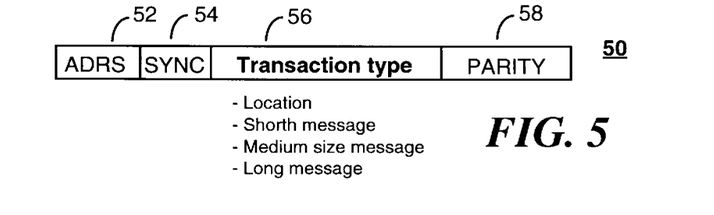
FIG. 5 is a frame structure illustrating a subscriber unit's inbound channel request in accordance with the present invention.
Figure 6:
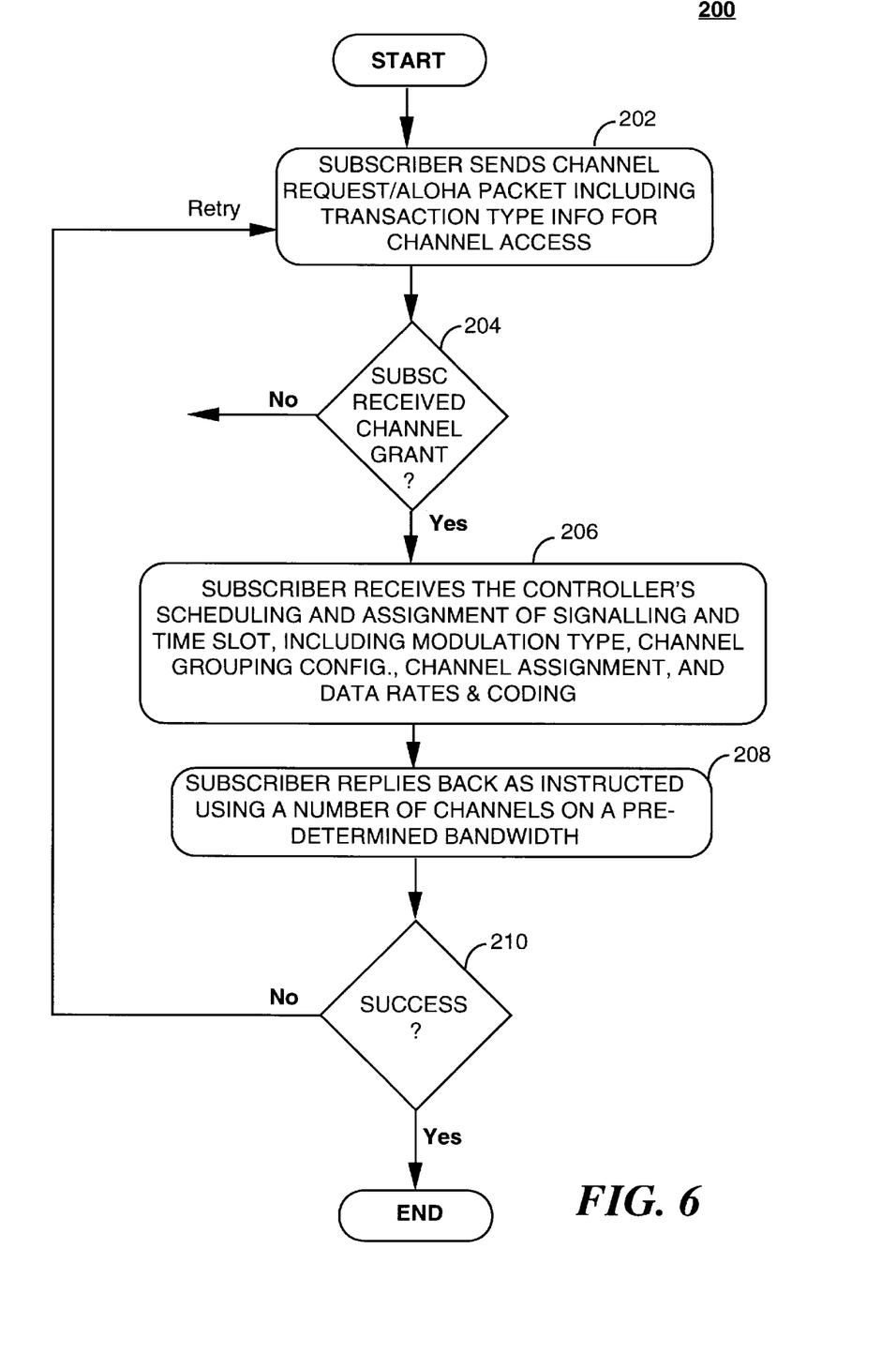
FIG. 6 is a flow chart illustrating the operation of a subscriber unit in accordance with the present invention.
Figure 7:
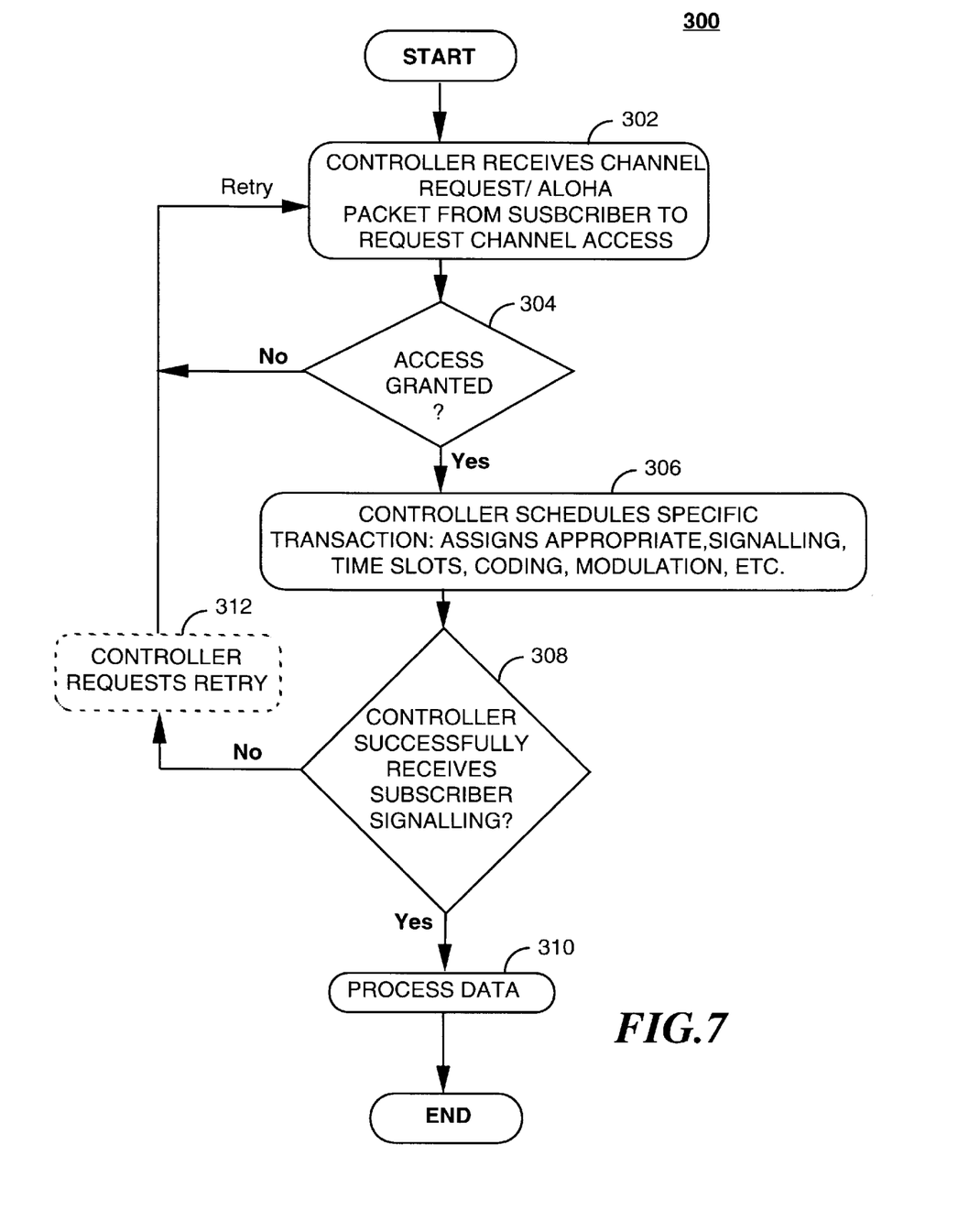
FIG. 7 is a flow chart illustrating the operation of a controller in accordance with the present invention.

Referring to FIGS. 5–7, a method 200 or 300 for dynamically configuring the number of channels within a communication system having a predetermined bandwidth comprises the steps at a subscriber unit of sending (202) a channel request (50) (or an ALOHA packet) to a controller or the steps at a controller of receiving (302) the channel request, wherein the channel request 50 preferably includes address information 52, synchronization information 54, parity information 58 and transaction type information 56 for a subsequent inbound transmission of information by the subscriber unit. The transaction type information could include application types such as location finding, short messaging, medium messaging, or long messaging. Long messaging could possibly include e-mail text, faxes, graphics, voice or even video information. If the controller denies access at decision block 204 or 304, the subscriber continues to retry for channel access. Otherwise, the subscriber unit at step 206 or 306 would receive from the infrastructure (the controller) information on how the subscriber should transmit inbound transmissions including information on scheduling and assignment of signalling. Thus, the controller determines a type of information to be transmitted from the channel request and configures the predetermined bandwidth into a number of channels based on the type of information to be transmitted inbound from the subscriber unit. Of course, as previously mentioned, the system may also consider capacity constraints as well as measured noise levels. The controller schedules the specific transactions and assigns appropriate signalling and time slots. In addition, the controller can set spread spectrum modulation types, channel grouping configurations, channel assignments, data rates, and code rates. The step of setting spread spectrum modulation types could further comprise the setting of hopping rates, hopping patterns, spread ratios, and spread ratios within hops. Therefore, the subscriber unit at step 208 replies in accordance with instructions from the controller using a number of channels on a predetermined bandwidth. Thus, at the controller at decision block 308, if the inbound subscriber signalling is successfully received by a base receiver, then the data received is processed at step 310. If the inbound signalling is unsuccessful, the controller can optionally request a retry transmission at step 312. The subscriber can optionally retry based on a time-out if no confirmation is received from the controller. Likewise at the subscriber at step 210, if the successful inbound signalling by the subscriber is confirmed back to the subscriber unit, then the method is completed, otherwise the subscriber retries and returns to step 202.

Figure 8:
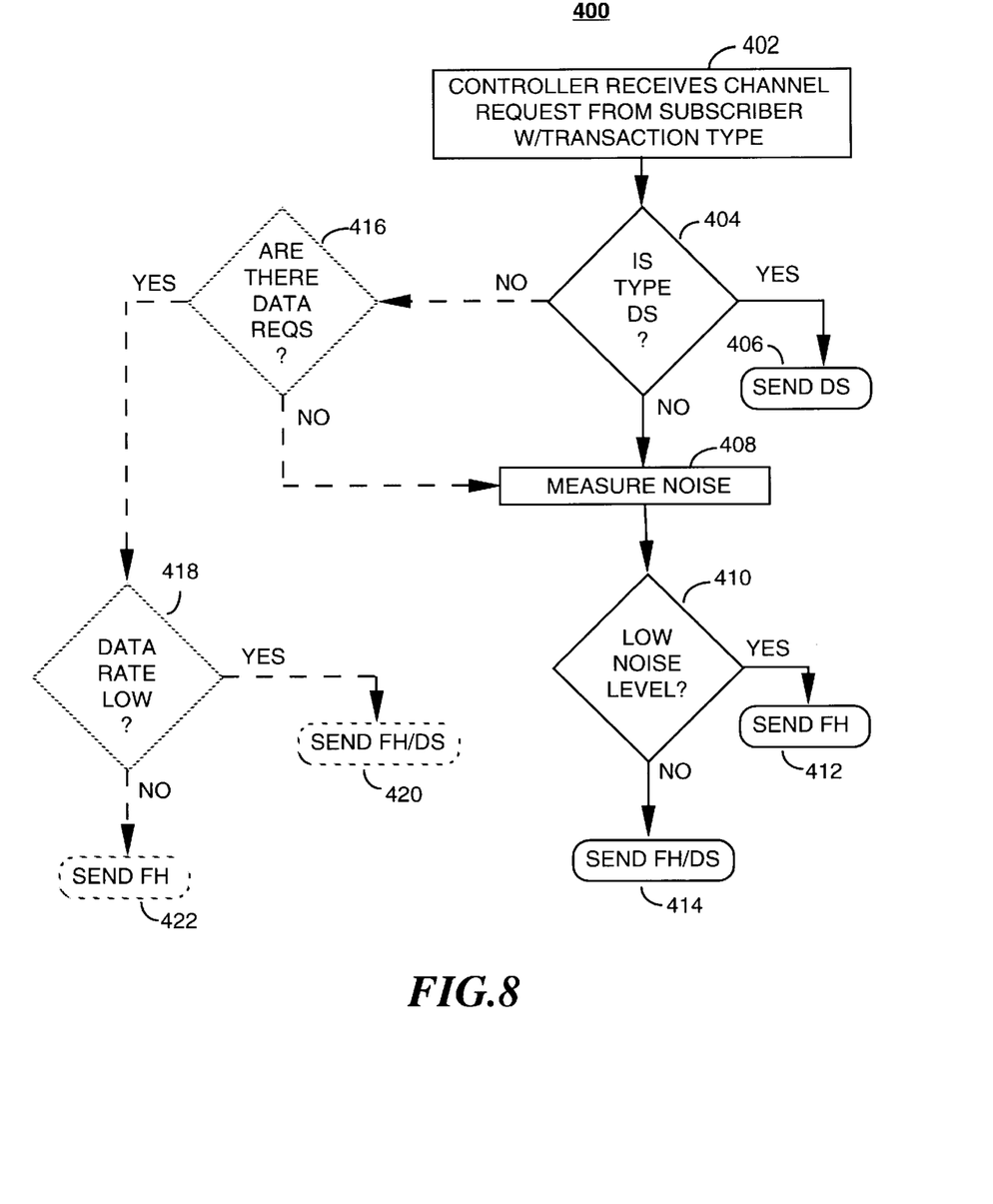
FIG. 8 is a flow chart illustrating an alternative operation of a controller in accordance with the present invention.

Referring to FIG. 8, another method in accordance with the present invention uses a selective call transceiver that uses a combination of spread spectrum spreading techniques. The selective call transceiver or subscriber unit sends a channel request including transaction type information which is received (402) at a controller. The subscriber unit preferably includes a selective call receiver that receives a control signal from the controller directing the selective call transceiver to transmit in a particular spread spectrum mode and a transmitter for transmitting in the particular spread spectrum mode. At decision block 404, if the controller receives type information from the subscriber unit indicating a location finding application, then direct sequence modulation is used by the subscriber for its inbound transmission at step 406. Otherwise, the system or subscriber can measure the noise level at step 408. At decision block 410, if the noise level measurement is "low", then the controller will assign the subscriber unit to use a frequency hopping modulation technique at step 412 and otherwise to use a hybrid FH/DS modulation technique at step 414 with the appropriate hops and spreading ratios as optimally required for such noisy environment. Alternatively, if the subscriber unit indicates that has a particular data requirement, then the controller at decision blocks 416 and 418 can determine whether a frequency hopped modulation technique should be used for a high data rate inbound transmission at step 422 or an appropriate FH/DS modulation technique for a lower data rate transmission at step 420. If the type information is not a location finding application (not DS at decision block 404) and there are no data requirements at decision block 416, then the noise is measured as previously described at step 408 and appropriate signalling of either FH or FH/DS modulation is provided.

Figure 9:
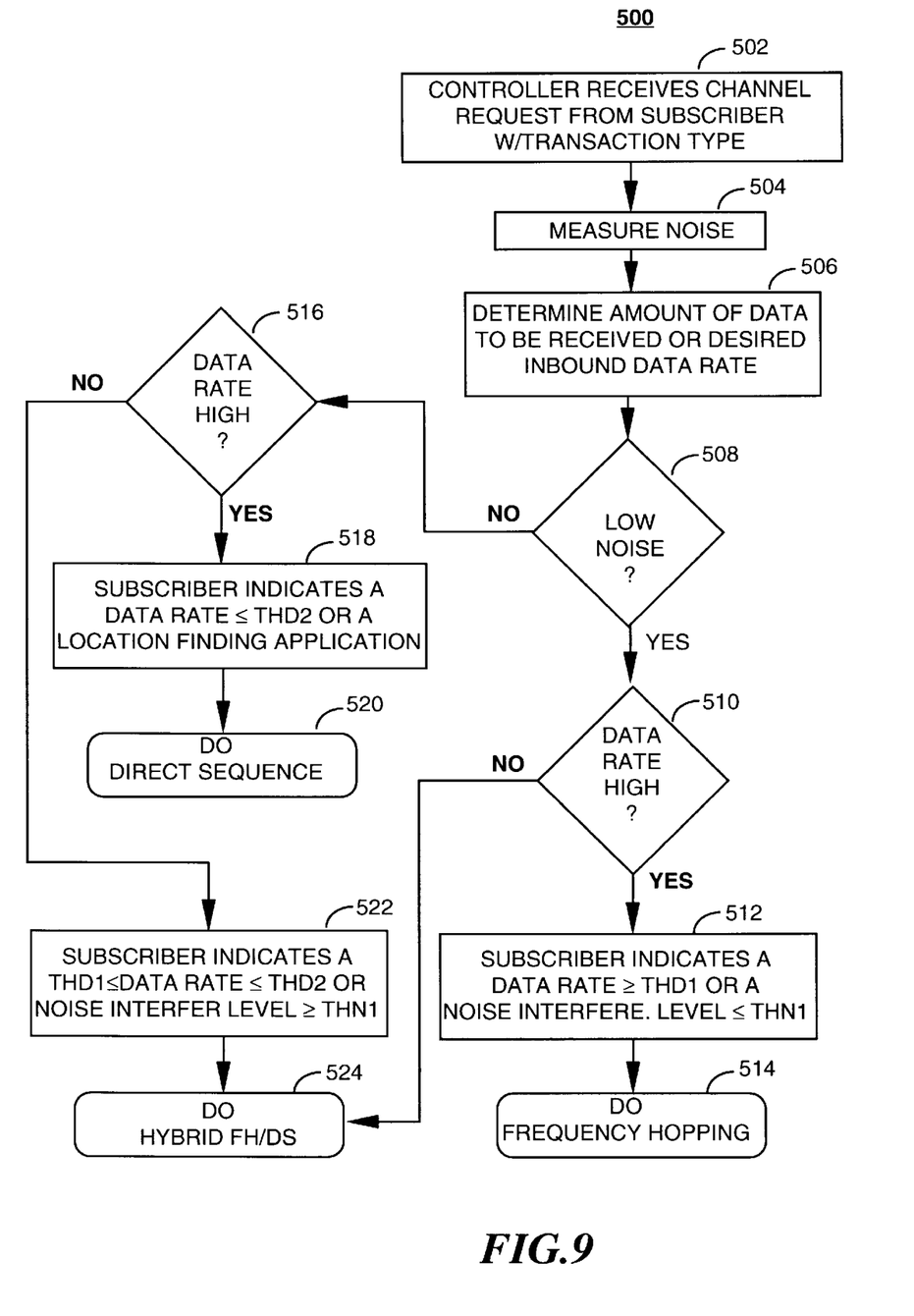
FIG. 9 is another flow chart illustrating an alternative operation of a controller in accordance with the present invention.

Referring to FIG. 9, a method 500 of selective call communication using a combination of spread spectrum spreading techniques comprises the steps of having the subscriber unit sending (502) a channel request having a transaction type. The controller, via the base receiver can measure the noise at step 504 and determine the amount of data to be received or alternatively a desired inbound data rate at step 506. Through decision blocks 508 and 510 and steps 512 and 514, the controller assigns a frequency hopped spread spectrum technique to a subscriber unit when the subscriber unit indicates a data rate transmission equivalent to or above a first data rate threshold or a noise interference level equivalent to or below a first noise threshold. Through decision blocks 508 and 516 and steps 522 and 524 the controller assigns a hybrid frequency hopped and direct sequence spread spectrum technique to the subscriber unit when the subscriber unit indicates a data rate below the first data rate threshold or a noise interference level above the first noise threshold. The controller could likewise assign a hybrid FH/DS spread spectrum technique at step 524 when a low noise and low data rate is indicated through decision blocks 508 and 510. Finally, through decision blocks 508 and 516 and steps 518 and 520, the controller assigns a direct sequence spread spectrum technique to the subscriber unit when the subscriber unit indicates a location finding application or a data rate below a second data rate threshold. In any event, the controller can modify a spread ratio for transmission from the subscriber unit based on the noise interference level measured. As shown in FIGS. 3 and 4 the method further comprises the steps of splitting a predetermined bandwidth into many channels when assigning a frequency hopped spread spectrum technique to the subscriber unit, and the step of grouping the many channels within the predetermined bandwidth into fewer channels when assigning the hybrid frequency hopped and direct spread spectrum technique to the subscriber unit and grouping the fewer channels into less channels when assigning the direct sequence spread spectrum technique to the subscriber unit. Preferably, a block information word is used to inform the subscriber unit on how to split or group the predetermined bandwidth.

Figure 10:
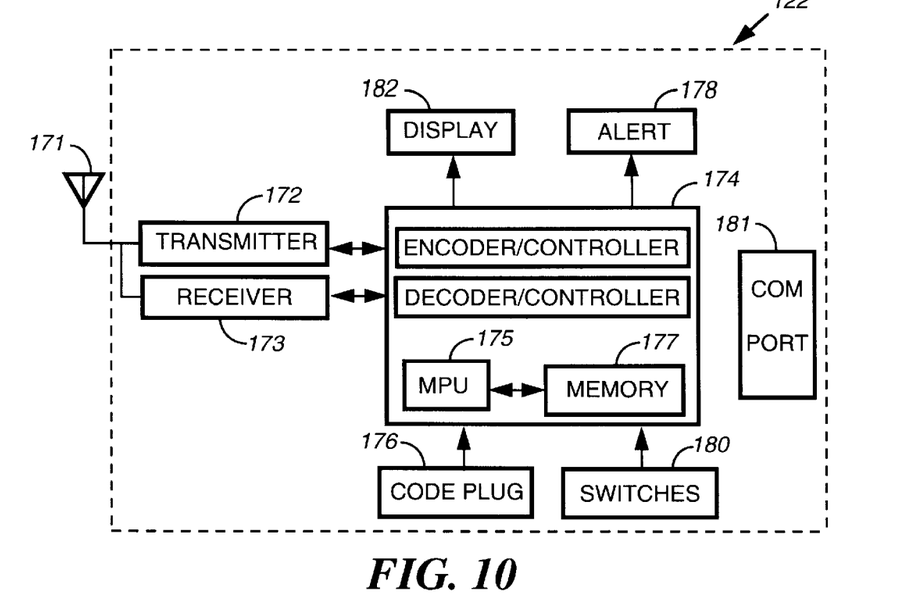
FIG. 10 is a subscriber unit in accordance with the present invention.

Referring to FIG. 10, a subscriber unit or transceiver 122 for receiving messages in a two way messaging system having a plurality of base transmitters preferably comprises a selective call receiver 173 coupled to a decoder and a controller (174) and a selective call transmitter 172 coupled to the controller and an encoder (174). The transceiver 122 preferably further comprises a memory 177 and a code plug 176 coupled to the controller 174.

The selective call transceiver can further comprise a display 182 such a liquid crystal display or a tactile or audible alert 178 such as a transducer or vibrator motor. The device 122 includes an antenna 171 for intercepting transmitted RF signals and for transmitting RF signals via the transmitter 172. The antenna 171 couples a received signal to a receiver 173, the receiver 173 and the transmitter 172 forming a transceiver. The transceiver produces a data stream representative of a demodulated received signal coupled to a decoder/controller 174. The transceiver (172, 173) is also responsive to a modulation input such as data received from the decoder/controller 174 to frequency modulate a carrier signal for transmission out from the device 122. As is well known in the art, the decoder/controller 174 may include a central processing unit such as a microprocessor 175 or the like for processing demodulated signal information in accordance with the software stored in a memory 177 of the decoder/controller 174. The decoder/controller 174 is preferably responsive to inputs from one or more switches 180 or other input devices to generate data that is coupled to the transceiver (172, 173) for transmission out from the device 122. The RF signals transmitted by the transmitter units of a paging system typically include control information containing an address that identifies a particular device 122. In a typical paging system, page message information follows the control information. The decoder/controller 174 decodes a received address by comparing it with one or more addresses stored in a code plug or code memory 176. If the decoder/controller 174 detects a match between a received address and a stored address, an alert signal may be generated by a device 178 so as to alert a user that a message has been received by the device 170. The alert signal may be an audible and/or tactile alert such as a silent vibrating alert. It is noted that if the RF signals only contain control information and no user viewable message, an alert need not be generated upon an address match. The switches 180 may be actuated by a user to select between the types of alerts as well as for inputting information to the memory 177 and causing a message stored in the memory of the decoder/controller 174 to be accessed for display on a display 182. The switches 180 may also provide additional functions such as reset, read, delete, etc. as is known or generate two-way functions or responds to messages. The device 170 may also include a conventional communication port 81 for hardwire connection to a wired subsystem as well.

Again, the selective call transceiver 122 that uses a combination of spread spectrum spreading techniques in accordance with the present invention comprises a selective call receiver 173 for receiving a control signal from a controller 112 (see FIG. 1 or FIG. 11) directing the selective call transceiver to transmit in a particular spread spectrum mode and a transmitter 172 for transmitting in the particular spread spectrum mode. The subscriber unit can operate in a multitude of ways, particularly as suggested by the flow charts of FIGS. 6–9. As an example, the transmitter can transmit using a frequency hopped spread spectrum technique when the subscriber unit indicates a data rate transmission equivalent to or above a first data rate threshold or a noise interference level equivalent to or below a first noise threshold. Or, the transmitter can transmit using a hybrid frequency hopped and direct sequence spread spectrum technique when the subscriber unit indicates a data rate below the first data rate threshold or a noise interference level above the first noise threshold. Or, the transmitter can transmit using a direct sequence spread spectrum technique when the subscriber unit indicates a location finding application or a data rate below a second data rate threshold.

Figure 11:
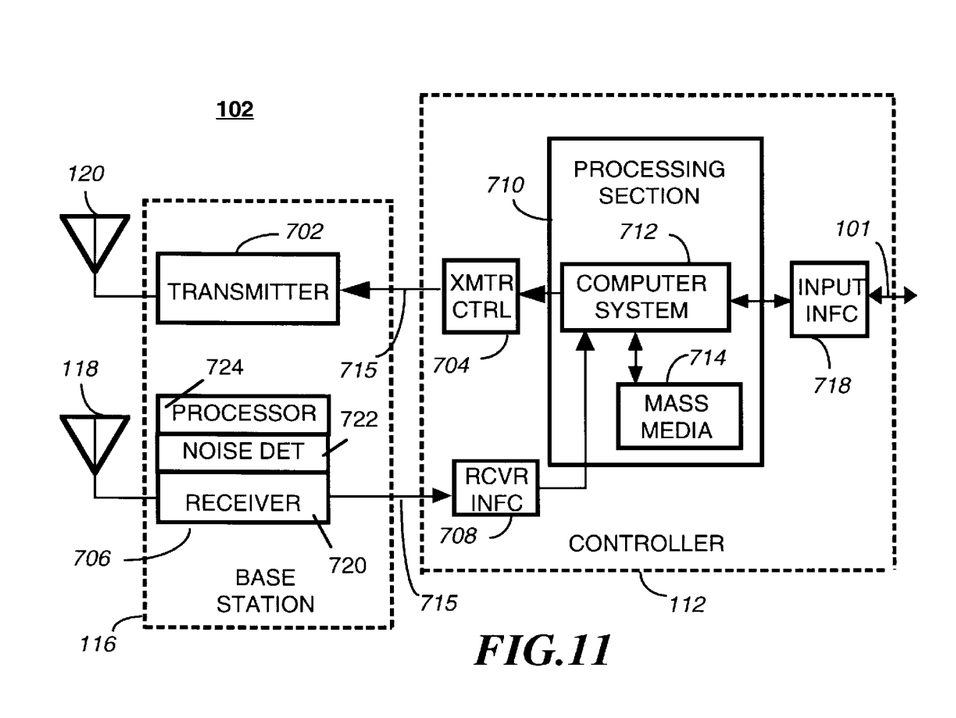
FIG. 11 is a controller in a spread spectrum communication system in accordance with the present invention.

With reference to FIG. 11, in another emodiment of the present invention, a base receiver 706 that receives transmissions from at least one of a plurality of selective call transceivers (122) that uses a combination of spread spectrum spreading techniques comprises a selective call receiver 720 for receiving a channel request on a predetermined bandwidth from at least one of the plurality of selective call transceivers, the channel request including a transmission type. The base receiver 706 further comprises a noise detector 722 for measuring a noise level environment for the transmission of information from the at least one of the plurality of selective call transceivers to the base receiver and a processor 724 for configuring the predetermined bandwidth into a number of channels based on the transmission type and the noise level environment, wherein the transmission type can be selected from the group consisting of location, short message, medium message, and long message among others.

Referring again to FIGS. 1 and 11, an electrical block diagram of elements of the fixed portion 102 in accordance with the preferred embodiment of the present invention comprises portions of the system controller 112 and the base stations 116. The system controller 112 comprises a processor section 710 for directing operation of the system controller 112. The system controller 112 schedules and queues data and stores voice messages for transmission to the selective call transceivers 122, connects telephone calls from the PSTN 110, and receives acknowledgments, demand responses, unsolicited data, channel requests and stored audio messages, and telephone calls from the selective call transceivers 122.

The processor section 710 preferably is coupled through a conventional transmitter controller 704 to a transmitter 702 via the communication links 715. The communication links 715 use conventional means well known in the art, such as a direct wire line (telephone) link, a data communication link, or any number of radio frequency links, such as a radio frequency (RF) transceiver link, a microwave transceiver link, or a satellite link, just to mention a few. The transmitter 702 transmits two and four-level FSK data messages to the selective call radios 122 during a digital message portion, and LSB, USB and a pilot during the analog message portion for voice messages if desired. If analog is used, the analog message portion is analog to digital converted to a conventional high speed digitally sampled signal, in a manner well known to one of ordinary skill in the art, for transmission over the communication links 715, then reconverted back to the analog message portion by the transmitter 116. The processor section 710 is also coupled to at least one base receiver 706 through a conventional receiver interface 708 via the communication links 715. The receiver 706 preferably demodulates as required by the controller 112 in synchrony with the modulation techniques assigned to the selective call transceiver 122 by the controller 112. The receiver 706 is preferably collocated with the base stations 116, as implied in FIG. 11, but can be positioned remote from the base stations 116 to avoid interference from the transmitter 702 and/or provide a larger inbound coverage area.

The processor section 710 is also coupled to an input interface 718 for communicating with the PSTN 110 through the telephone links 101 for receiving selective call originations from a message originator. In order to perform the functions (to be described below) necessary in controlling the elements of the system controller 112, as well as the elements of the base stations 116, the processor section 710 preferably includes a conventional computer system 712, and conventional mass storage media 714. The conventional mass storage media 714 includes the subscriber data base which has subscriber user information such as, for example, selective call radio 122 addressing, programming options, etc. The conventional computer system 712 is programmed by way of program instructions included in the conventional mass storage media 714. The conventional computer system 712 preferably comprises a plurality of processors such as VME Sparc processors manufactured by Sun Microsystems, Inc., and is alternatively described as the computer 712. The plurality of processors include memory such as dynamic random access memory (DRAM), which serves as a temporary memory storage device for scratch pad processing such as, for example, storing analog and digital messages originated by callers using the PSTN 110, processing acknowledgments or other messages received from the selective call radios 122, and for protocol processing of analog and digital messages destined for the selective call radios 122, just to mention a few. The conventional mass storage media 714 is preferably a conventional hard disk mass storage device, which can also serve as a message memory for digitally encoded analog signals.

It will be appreciated that other types of conventional computer systems 712 can be utilized, and that additional computer systems 712 and mass storage media 714 of the same or alternative type can be added as required to handle the processing requirements of the processing section 710.

The processor section 710 provides message handling functions which schedule outbound and inbound messages having selective call addresses associated therewith, for transmission within a transmission cycle. This is accomplished by scheduling, as necessary, portions of messages within different frames of a transmission cycle. As described above, messages may have either digital information, such as a alphanumeric message, fax, graphics, or digitized voice or video or analog information, such as voice. An analog message can be included within one or more analog frames.

The processor section 710 in performing the message handling functions also identifies inbound messages as being associated with one of the selective call radios in a subscriber data base and identifies response messages as being associated with one of the outbound messages in an outbound message memory, which is a portion of the mass media 714. As one example of an operation of the system controller 112, the delivery of an outbound message stored in the mass memory 714 is completed when: the outbound message has been communicated to the intended selective call radio 122; the outbound message is acknowledged by an inbound acknowledgment generated by the selective call radio 122; the outbound message and some possible responses are presented either on a display or by a speaker of the selective call radio 122 in response to a user manipulation of controls; one of the possible responses is selected by the user and identified within an inbound response transmitted back to the system controller 112 from the selective call radio 122; and the user inbound response is identified by the message handler function as having been generated by the user specifically in response to the outbound message. In this example, the processor section 710 generates another message which is sent to the originator of the outbound message to notify the originator that the outbound message has been acknowledged by the selective call radio 122 and responded to by the user of the selective call radio 122.

The processor section 710 performs functions including the message handing functions described above, which are conventional, and functions described below with reference to FIG. 4, which are unique. The conventional and unique functions are executed by the conventional computer system 712 and controlled by program instructions that can be stored in the mass storage media 714. The unique functions are controlled by a unique set of program instructions generated using conventional programming tools.

A controller that dynamically configures the number of channels within a communication system having a predetermined bandwidth comprises a processor (710) and memory (714), wherein the processor is programmed to receive a channel request from a subscriber unit for an inbound transmission of information, determine a type of information to be transmitted from the channel request, and configure the predetermined bandwidth into a number of channels based on the type of information to be transmitted from the subscriber unit. Preferably, the processor is further programmed to receive a packet of information containing address information, synchronization information, and transaction type information. The processor can be further programmed to schedule specific transactions and assign appropriate signalling and time slots or to set spread spectrum modulation types, channel grouping configurations, channel assignments, data rates, and code rates. Further, the processor can be programmed to set hopping rates, hopping patterns, spread ratios, and spread ratios within hops.

In another embodiment of the present invention, a controller in a selective call communication system using a combination of spread spectrum spreading techniques and generally using the method outlined in FIG. 9 comprises a processor (710) and memory (714), wherein the processor performs the functions of assigning a frequency hopped spread spectrum technique to a subscriber unit when the subscriber unit indicates a data rate transmission equivalent to or above a first data rate threshold or a noise interference level equivalent to or below a first noise threshold. Or, assigning a hybrid frequency hopped and direct sequence spread spectrum technique to the subscriber unit when the subscriber unit indicates a data rate below the first data rate threshold or a noise interference level above the first noise threshold, or assigning a direct sequence spread spectrum technique to the subscriber unit when the subscriber unit indicates a location finding application or a data rate below a second data rate threshold. As described above, the processor preferably further performs the function of splitting a predetermined bandwidth into many channels when assigning a frequency hopped spread spectrum technique to the subscriber unit, and grouping the many channels within the predetermined bandwidth into fewer channels when assigning the hybrid frequency hopped and direct spread spectrum technique to the subscriber unit and grouping the fewer channels into less channels when assigning the direct sequence spread spectrum technique to the subscriber unit. The processor further performs the function of modifying a spread ratio for transmission from the subscriber unit based on the noise interference level measured. The processor may also use a block information word to inform the subscriber unit on how to split or group the predetermined bandwidth.

It should be understood that the disclosed embodiments are merely examples and the invention is not restricted thereto. It should be further understood by those skilled in the art that variations and modifications can be made without deviating from the scope and spirit of the present invention defined by the appended claims.

What is claimed is:

1. A method for dynamically configuring a number of channels within a spread spectrum communication system having a predetermined bandwidth, comprising the steps at a controller of:

receiving a channel request from a subscriber unit for an inbound transmission of information, said step of receiving a channel request further comprises a step of receiving a packet of information containing address information, synchronization information, and transaction type information;

determining a type of information to be transmitted from the channel request; and configuring the predetermined bandwidth into a number of channels based on the type of information to be transmitted from the subscriber unit, said step of configuring further including scheduling specific transactions assigning appropriate signalling and time slots and setting spread spectrum modulation types, channel grouping configurations, channel assignments, data rates, and code rates.

2. The method claim 1, wherein the step of setting spread spectrum modulation types further comprises a step of setting hopping rates, hopping patterns, spread ratios, and spread ratios within hops.

3. A method of selective call communication using a combination of spread spectrum spreading techniques, comprising the steps of:

assigning a frequency hopped spread spectrum technique to a subscriber unit when the subscriber unit indicates a data rate transmission equivalent to or above a first data rate threshold or a noise interference level equivalent to or below a first noise threshold;

assigning a hybrid frequency hopped and direct sequence spread spectrum technique to the subscriber unit when the subscriber unit indicates a data rate below the first data rate threshold or a noise interference level above the first noise threshold; and assigning a direct sequence spread spectrum technique to the subscriber unit when the subscriber unit indicates a location finding application or a data rate below a second data rate threshold.

4. The method of claim 3, wherein the method further comprises a step of splitting a predetermined bandwidth into many channels when assigning a frequency hopped spread spectrum technique to the subscriber unit, and a step of grouping the many channels within the predetermined bandwidth into fewer channels when assigning the hybrid frequency hopped and direct spread spectrum technique to the subscriber unit and grouping the fewer channels into less channels when assigning the direct sequence spread spectrum technique to the subscriber unit.

5. The method of claim 4, wherein the method further comprises a step of using a block information word to inform the subscriber unit on how to split or group the predetermined bandwidth.

6. The method of claim 3, wherein the method further comprises a step of modifying a spread ratio for transmission from the subscriber unit based on the noise interference level measured.

7. A controller that dynamically configures a number of channels within a spread spectrum communication system having a predetermined bandwidth, comprises:

a processor and a memory, wherein the processor is programmed to:

receive a channel request from a subscriber unit for an inbound transmission of information and a packet of information containing address information, synchronization information, and transaction type information;

schedule specific transactions and assign appropriate signalling and time slots and set spread spectrum modulation types, channel grouping configurations, channel assignments, data rates, and code rates determine a type of information to be transmitted from the channel request; and configure the predetermined bandwidth into a number of channels based on the type of information to be transmitted from the subscriber unit.

8. The controller of claim 7, wherein the processor is further programmed to set hopping rates, hopping patterns, spread ratios, and spread ratios within hops.

9. A controller in a selective call communication system using a combination of spread spectrum spreading techniques, comprising:

a processor and a memory, wherein the processor performs the functions of:

assigning a frequency hopped spread spectrum technique to a subscriber unit when the subscriber unit indicates a data rate transmission equivalent to or above a first data rate threshold or a noise interference level equivalent to or below a first noise threshold;

assigning a hybrid frequency hopped and direct sequence spread spectrum technique to the subscriber unit when the subscriber unit indicates a data rate below the first data rate threshold or a noise interference level above the first noise threshold; and assigning a direct sequence spread spectrum technique to the subscriber unit when the subscriber unit indicates a location finding application or a data rate below a second data rate threshold.

10. The controller of claim 9, wherein the processor further performs the function of splitting a predetermined bandwidth into many channels when assigning a frequency hopped spread spectrum technique to the subscriber unit, and grouping the many channels within the predetermined bandwidth into fewer channels when assigning the hybrid frequency hopped and direct spread spectrum technique to the subscriber unit and grouping the fewer channels into less channels when assigning the direct sequence spread spectrum technique to the subscriber unit.

11. The controller of claim 10, wherein the processor uses a block information word to inform the subscriber unit on how to split or group the predetermined bandwidth.

12. The controller of claim 9, wherein the processor further performs the function of modifying a spread ratio for transmission from the subscriber unit based on the noise interference level measured.

13. A controller in a selective call communication system using a combination of spread spectrum spreading techniques wherein the controller sends a control signal to a subscriber unit to transmit in a particular spread spectrum mode, the controller comprising:

a processor and a memory, wherein the processor performs the functions of:

assigning a direct sequence spread spectrum technique when the subscriber unit indicates a location finding application; and otherwise assigning a frequency hopped spread spectrum technique when the controller measures a low noise level environment or using a hybrid frequency hopped and direct sequence spread spectrum technique when the controller measures a high noise level environment.

14. A selective call transceiver that uses a combination of spread spectrum spreading techniques, comprises:

a selective call receiver for receiving a control signal from a controller directing the selective call transceiver to transmit in a particular spread spectrum mode; and a transmitter for transmitting in the particular spread spectrum mode, wherein the transmitter transmits:

using a frequency hopped spread spectrum technique when the subscriber unit indicates a data rate transmission equivalent to or above a first data rate threshold or a noise interference level equivalent to or below a first noise threshold;

using a hybrid frequency hopped and direct sequence spread spectrum technique when the selective call transceiver indicates a data rate below the first data rate threshold or a noise interference level above the first noise threshold; and using a direct sequence spread spectrum technique when the subscriber unit indicates a location finding application or a data rate below a second data rate threshold.

15. A selective call transceiver that uses a combination of spread spectrum spreading techniques, comprises:

a selective call receiver for receiving a control signal from a controller directing the selective call transceiver to transmit in a particular spread spectrum mode; and a transmitter for transmitting in the particular spread spectrum mode, wherein the transmitter transmits:

using a direct sequence spread spectrum technique when the subscriber unit indicates a location finding application; and otherwise using a frequency hopped spread spectrum technique when the controller measures a low noise level environment or using a hybrid frequency hopped and direct sequence spread spectrum technique when the controller measures a high noise level environment.

16. A base receiver that receives transmissions from at least one of a plurality of selective call transceivers that uses a combination of spread spectrum spreading techniques, the base receiver comprising:

a selective call receiver for receiving a channel request on a predetermined bandwidth from at least one of the plurality of selective call transceivers, the channel request including a transmission type;

a noise detector for measuring a noise level environment during a transmission of information from the at least one of the plurality of selective call transceivers to the base receiver; and a processor for configuring the predetermined bandwidth into a number of channels based on the transmission type and the noise level environment, wherein the transmission type is selected from the group consisting of location, short message, medium message, and long message.

* * * * *